US009247290B2

(12) United States Patent
Wong et al.

(10) Patent No.: US 9,247,290 B2
(45) Date of Patent: Jan. 26, 2016

(54) SEAMLESS TRANSITION BETWEEN DISPLAY APPLICATIONS USING DIRECT DEVICE SELECTION

(75) Inventors: Ling Jun Wong, Champaign, IL (US); Charles McCoy, Coronado, CA (US); True Xiong, San Diego, CA (US)

(73) Assignees: Sony Corporation, Tokyo (JP); Sony Network Entertainment Internation LLC, Los Angeles, CA (US)

( * ) Notice: Subject to any disclaimer, the term of this patent is extended or adjusted under 35 U.S.C. 154(b) by 346 days.

(21) Appl. No.: 13/243,109

(22) Filed: Sep. 23, 2011

(65) Prior Publication Data

US 2012/0206423 A1    Aug. 16, 2012

Related U.S. Application Data

(60) Provisional application No. 61/443,626, filed on Feb. 16, 2011.

(51) Int. Cl.
| | |
|---|---|
| *G06F 15/173* | (2006.01) |
| *H04N 21/44* | (2011.01) |
| *H04N 5/445* | (2011.01) |
| *H04N 21/41* | (2011.01) |
| *H04N 21/443* | (2011.01) |
| *H04N 21/482* | (2011.01) |
| *H04N 7/173* | (2011.01) |

(52) U.S. Cl.
CPC ..... *H04N 21/44016* (2013.01); *H04N 5/44543* (2013.01); *H04N 21/4126* (2013.01); *H04N 21/443* (2013.01); *H04N 21/482* (2013.01); *H04N 2005/44556* (2013.01)

(58) Field of Classification Search
CPC ............... H04N 21/4126; H04N 21/44016; H04N 21/443; H04N 21/482
See application file for complete search history.

(56) References Cited

U.S. PATENT DOCUMENTS 6,002,450 A * 12/1999 Darbee ................. G06F 3/147
340/12.54
6,603,488 B2 * 8/2003 Humpleman et al. ........ 715/771
(Continued)

FOREIGN PATENT DOCUMENTS

| CN | 101835278 A | 9/2010 | |
|---|---|---|---|
| WO | WO 2008048008 A1 * | 4/2008 | ............. G06F 17/00 |
| WO | WO 2012011639 A1 * | 1/2012 | ............. H04W 88/02 |

OTHER PUBLICATIONS

Braun et al., "Accessing web applications with multiple Context-aware devices," Darmstadt University of Technology, original publication date unknown, accessed at http://www.cs.helsinki.fi/u/jakangas/Papers/diwe-color.pdf, pp. 1-14.

*Primary Examiner* — Abu Sholeman
*Assistant Examiner* — Maung Lwin
(74) *Attorney, Agent, or Firm* — Procopio Cory Hargreaves & Savitch LLP

(57) ABSTRACT

Transitioning between display applications, including: retrieving a device identifier when a first device is selected using a first display application running on a second device; enabling the first display application to launch a second display application using the device identifier of the first device, launching the second display application customized to automatically select the first device, wherein the automatic selection of the first device using the device identifier allows to bypass a device selection process. Keywords include seamless transition and direct device selection.

16 Claims, 3 Drawing Sheets

(56) References Cited

U.S. PATENT DOCUMENTS

| | | |
|---|---|---|
| 7,448,058 B2 | 11/2008 | Heyner et al. |
| 2007/0136778 A1* | 6/2007 | Birger et al. ................. 725/117 |
| 2008/0155062 A1* | 6/2008 | Rabold et al. ................. 709/219 |
| 2009/0043842 A1 | 2/2009 | Rhim et al. |
| 2009/0059090 A1* | 3/2009 | Fan ................... G07C 9/00031 348/734 |
| 2009/0119182 A1* | 5/2009 | Krstulich ................ G06F 21/42 705/26.1 |
| 2009/0132717 A1 | 5/2009 | Maes |
| 2009/0138941 A1* | 5/2009 | Monjas Llorente  H04L 63/0815 726/4 |
| 2009/0150553 A1* | 6/2009 | Collart ............. G06F 17/30017 709/229 |
| 2009/0178124 A1* | 7/2009 | Manion ................ G06F 21/305 726/6 |
| 2010/0023578 A1* | 1/2010 | Brant ................ G06F 17/30749 709/203 |
| 2010/0023983 A1 | 1/2010 | Choi et al. |
| 2010/0058255 A1* | 3/2010 | Stefanik et al. ............... 715/866 |
| 2010/0088152 A1* | 4/2010 | Bennett .......................... 705/10 |
| 2010/0254370 A1* | 10/2010 | Jana et al. ..................... 370/352 |
| 2010/0312596 A1* | 12/2010 | Saffari et al. ..................... 705/7 |
| 2010/0332841 A1* | 12/2010 | Watts ..................... G06F 21/43 713/182 |
| 2011/0167447 A1* | 7/2011 | Wong .............................. 725/40 |
| 2012/0117627 A1* | 5/2012 | Huang ............... G06F 21/6218 726/4 |

* cited by examiner

SEAMLESS TRANSITION BETWEEN DISPLAY APPLICATIONS USING DIRECT DEVICE SELECTION

CROSS-REFERENCE TO RELATED APPLICATIONS

This application claims the benefit of priority of U.S. Provisional Patent Application No. 61/443,626, filed Feb. 16, 2011, entitled "Seamless Transition between Native Application and Web Application using Direct Device Selection." The disclosure of the above-referenced patent application is incorporated herein by reference.

BACKGROUND

1. Field of the Invention

The present invention relates to seamless transition between a plurality of display applications, and more specifically, to seamless transition using direct device selection.

2. Background

Media content can be browsed, searched, and selected using Internet Protocol television (IPTV) which uses the architecture and networking methods of the Internet Protocol Suite over a packet-switched network infrastructure. The selected media content can be viewed on a display of a first device such as the IPTV using a second device to control the functions of the IPTV. Then, the media content can continue to be browsed and searched using the second device without interrupting the content that is being viewed on the display of the IPTV.

SUMMARY

The present invention provides for seamless transitions between a plurality of display applications.

In one implementation, a method of transitioning between a plurality of display applications is disclosed. The method includes: retrieving a device identifier when a first device is selected using a first display application running on a second device; enabling the first display application to launch a second display application using the device identifier of the first device, launching the second display application customized to automatically select the first device, wherein the automatic selection of the first device using the device identifier allows to bypass a device selection process.

In another implementation, a non-transitory storage medium storing a computer program to manage transitions between a plurality of display applications is disclosed. The computer program includes executable instructions that cause a computer to: retrieve a device identifier when a first device is selected using a first display application running on a second device; enable the first display application to launch a second display application using the device identifier of the first device, launch the second display application customized to automatically select the first device, wherein the automatic selection of the first device using the device identifier allows to bypass a device selection process.

Other features and advantages of the present invention will become more readily apparent to those of ordinary skill in the art after reviewing the following detailed description and accompanying drawings.

DETAILED DESCRIPTION

Figure 1:
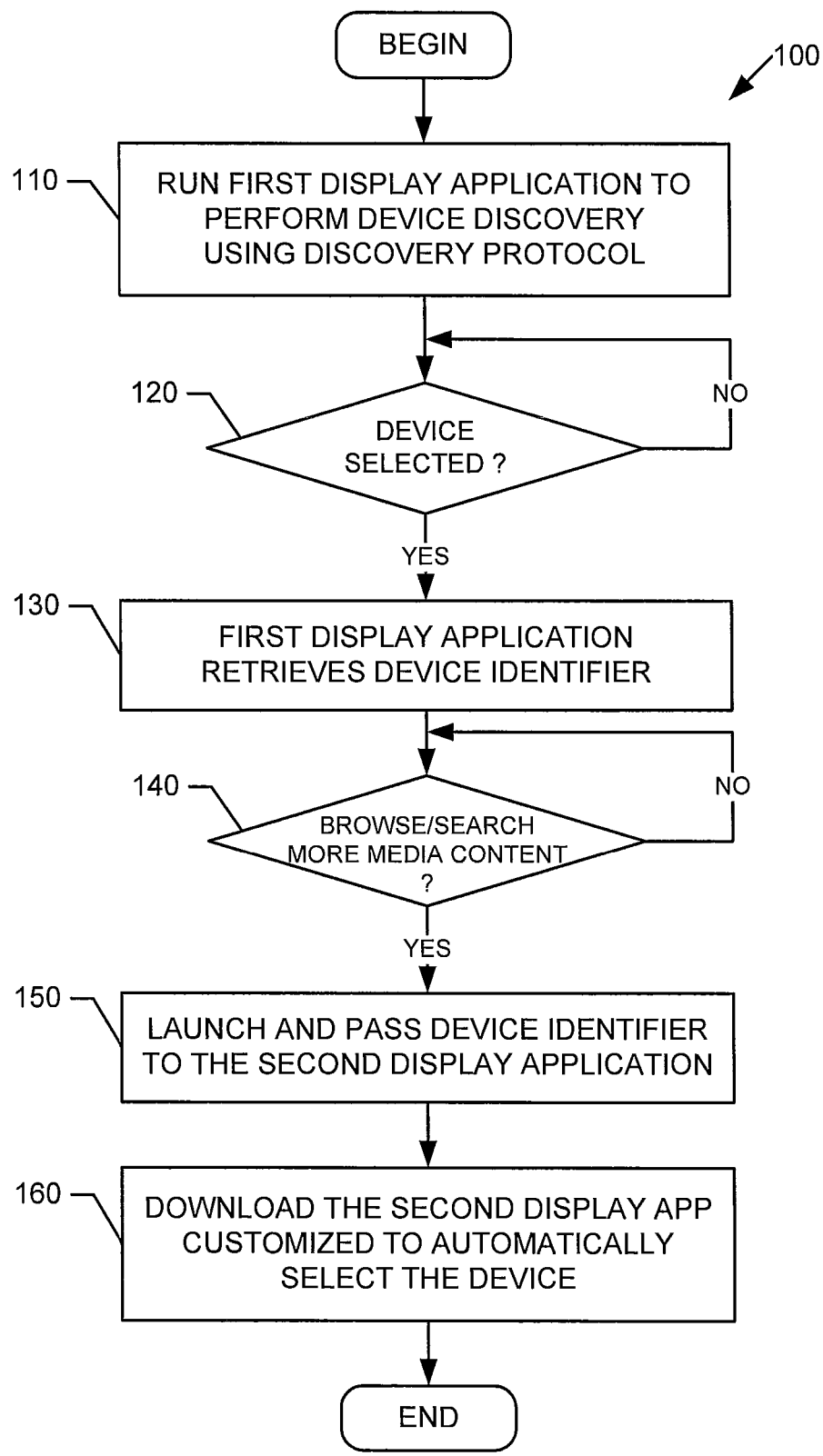
FIG. 1 shows a flowchart illustrating a seamless transition method in accordance with one implementation of the present invention.

As described above, media content can be browsed, searched, and selected using a first device, such as the IPTV, and a second device. Once selected, the media content can be viewed on a display of the IPTV by controlling the functions of the IPTV using the second device. Enabling control of the IPTV functions from the second device typically involves a first display application which is a native application running on the second device. However, to continue to browse and search the media content while the selected media content is being viewed on the display of the IPTV, a second display application typically needs to be loaded onto the second device before the media content can be browsed and searched. In one implementation, the second display application is a downloadable application (e.g., ANDROID™, iOS, etc.) and/or web-based application. In another implementation, the second display application can also be a native application.

Certain implementations as disclosed herein provide for seamless transition between the first display application and the second display application within a device using direct device selection. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In one implementation, a second device, such as a cellular phone, laptop computer, or any portable device, is used to browse, search, and select media content but the selected media content is played on a first device (e.g., a big screen display of an IPTV client for convenient viewing). A first display application residing or loaded on the second device can be used to control the functions of the IPTV client to play, present, or view the selected media content on the display of the IPTV client. Further, the selected media content can be shared, bookmarked, queued, and/or recommended within a social network. In other implementations, the first display application can also detect other devices on the network and allow the user to choose device(s) to control. The user can then continue to browse, search, and select other media content using the second device or any number of additional devices without interrupting the content that is being played on the display of the IPTV client. However, as discussed above, to continue to browse and search the media content while the selected media content is being viewed on the display of the IPTV client, a second display application typically needs to be loaded onto the second device.

Further, by requiring that the user send the selected media content for playback on the IPTV client only when the user is ready to watch the content, the security risks can be substantially reduced because the playback of proprietary media content occurs only on the authenticated IPTV client rather than on a non-authenticated second device or other devices. Since the second display application (e.g., a web-based application) of the second device is usually written in HTML, it can be loaded by any device with a browser. It should be noted that the second display application need not necessarily be written in HTML but in any browser-supported language such as Java Script and/or other markup languages. In an alternative, the user can use a native application already installed on the second device as a second display application rather than loading the web-based application for browsing and searching of the media content. Further, the second display application can be hosted in the cloud so that it is accessible from anywhere.

A first display application is typically designed to run on a device's operating system and machine firmware, and needs to be adapted for different devices. The first display application can detect devices on the network and allow the user to choose the device to control. For example, the first display application is configured to control the IPTV client. In contrast, a second display application is typically configured to download parts of the software from the web each time it is run. It can usually be accessed from any web-capable device.

In one implementation, seamless transitions between a first display application and a second display application are provided. In a particular implementation, the seamless transition method involves seamlessly transitioning between the first display application residing on the second device and the second display application loaded onto the second device using direct device selection. For example, FIG. 1 shows a flowchart illustrating the seamless transition method 100 in accordance with one implementation of the present invention. In the illustrated implementation of FIG. 1, the seamless transition method 100 includes running the first display application to perform a device discovery using a discovery protocol, at box 110. When the user selects a device such as the IPTV client, at box 120, the first display application retrieves the device identifier of the IPTV client, at box 130. In one implementation, the first display application typically performs remote controlling functions of the IPTV client, such as a keyboard input, an IPTV remote control key input, and other functions. These remote controlling functions are used to present or display selected media content on the display of the IPTV client.

When it is determined, at box 140, that the user desires to browse or search more media content, the first display application launches a second display application and passes the device identifier of the IPTV client, at box 150. In one example, the first display application starts the second display application with information about the device (e.g., the IPTV client) that was last targeted. In other examples, the first display application can pass the device identifier in many different ways. In response, the IPTV server recognizes the device identifier of the IPTV client and downloads a second display application customized to automatically select the IPTV client. Thus, the IPTV client downloads the second display application customized to automatically select the IPTV client, at box 160. The automatic selection of the IPTV client using the device identifier allows the user to skip the device selection process when the user desires to use the same device (i.e., the IPTV client) again. In one variation, instead of downloading the second display application customized to automatically select the IPTV client, a device identifier can be bookmarked in the second display application. The user can now browse and search more media contents for that IPTV client without the need to select the device again on the second display application. Thus, a seamless transition from the first display application to the second display application is accomplished.

Similarly, when the user desires to switch devices (e.g., from the IPTV client to another device or client), the second display application makes a call to the internal server of the first display application with information about the changing device. This allows the user to be able to switch device control on both applications. In one variation, instead of making a call to the internal server of the first display application to pass the information, the information can be passed to the first display application by storing it in a cookie or file, and having the first display application read the stored information from the cookie or file. In another variation, the information can be passed as an anchor in the URL so that the first display application can identify and determine whether the device has been changed or not so that it can be synchronized in the same way.

Figure 2:
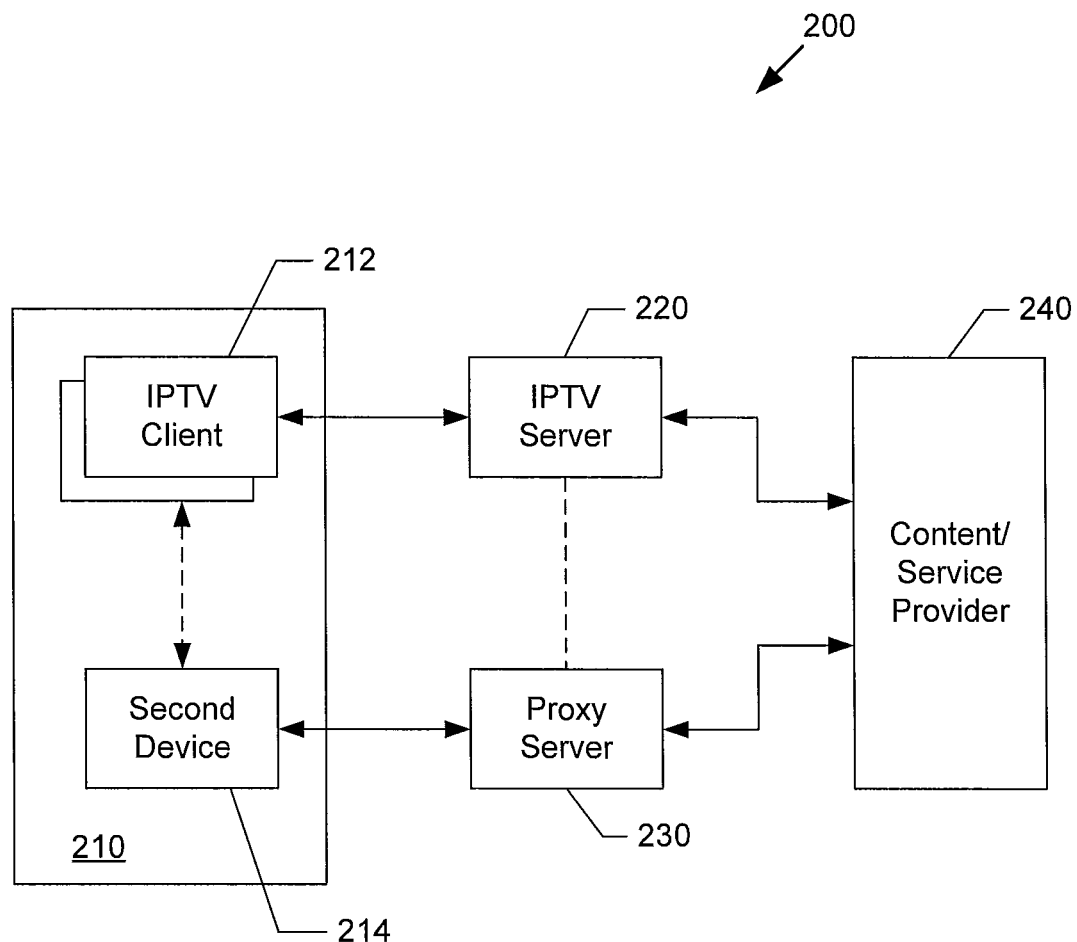
FIG. 2 shows a system configured to enable seamless transitions between display applications using direct device selection.

FIG. 2 shows a system 200 configured to enable seamless transitions between a first display application and a second display application using direct device selection. In the illustrated implementation of FIG. 2, the system 200 includes an IPTV client 212 and a second device 214 configured within a same local network 210, which are in communication with an IPTV server 220 and a proxy server 230. The servers 220, 230 are in communication with a content/service provider 240.

In one implementation, the user loads a second display application onto the second device 214 and logs into an account in the proxy server 230 configured to provide media content service. In an alternative implementation, the user can use a first display application already installed on the second device 214 to log into the proxy server account. Once logged into the account, the second device 214 receives a list of compatible IPTV clients 212.

In the case of a non-standard IPTV client, a local discovery protocol can be used to discover the IPTV device instead of logging onto the server. In this case, the second device 214 controls only the native settings of the IPTV device, and there is also no communication with any entity outside the local network 210.

In one implementation, using a first display application residing on the second device 214, the user selects an IPTV client 212, and a list of services available to the client 212 is shown on the display of the second device 214. Once the IPTV client 212 is selected, the user uses the first display application on the second device 214 to control the IPTV client 212 and to present the media content available to the client 212. However, the second device 214 sends only a reference identifier for the selected media content to the IPTV client 212, which retrieves the content using the reference identifier. Further, the first display application retrieves a device identifier of the IPTV client 212.

The IPTV client 212 sends the reference identifier to the IPTV server 220 which in turn sends it to the content/service provider 240. In an alternative, the second device 214 sends the reference identifier to the IPTV server 220. However, only the authenticated IPTV client 212 receives the media content selected by the second device 214 (using the reference identifier) from the content/service provider 240 through the IPTV server 220. Thus, the unauthenticated second device 214 is not given access to the content URL to reduce the risk of exposing proprietary information. During presentation or playback, the user using the second device 214 continues to browse, search, select, and queue other content for future playback without interrupting the content that is being played on the IPTV client 212. In one implementation, both the selected IPTV client 212 and the second device 214 must be in the same local network 210 in order to perform a playback of the selected content. The user can also switch clients 212 and resume playback on a different client by selecting from a recently viewed list of the last media content played and after switching control to that device. In another implementation, the communication between the two devices can be passed through a server in the cloud which maintains a communication channel with both devices.

For security reasons, content transaction between the second device 214 and the content/service provider 240 occurs on the proxy server 230 to create a firewall. When the user desires to continue browsing and searching media content, the first display application launches a second display application and passes the device identifier of the IPTV client 212.

Figure 3A:
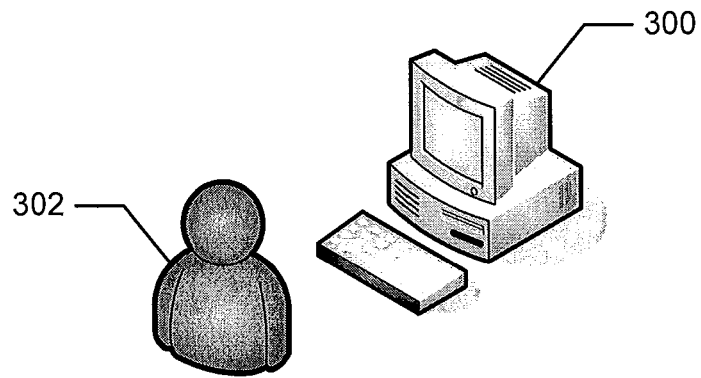
FIG. 3A illustrates a representation of a computer system and a user.

FIG. 3A illustrates a representation of a computer system 300 and a user 302. The user 302 uses the computer system 300 to provide seamless transitions between a first display application and a second display application. The computer system 300 stores and executes a seamless transition manager 390.

Figure 3B:
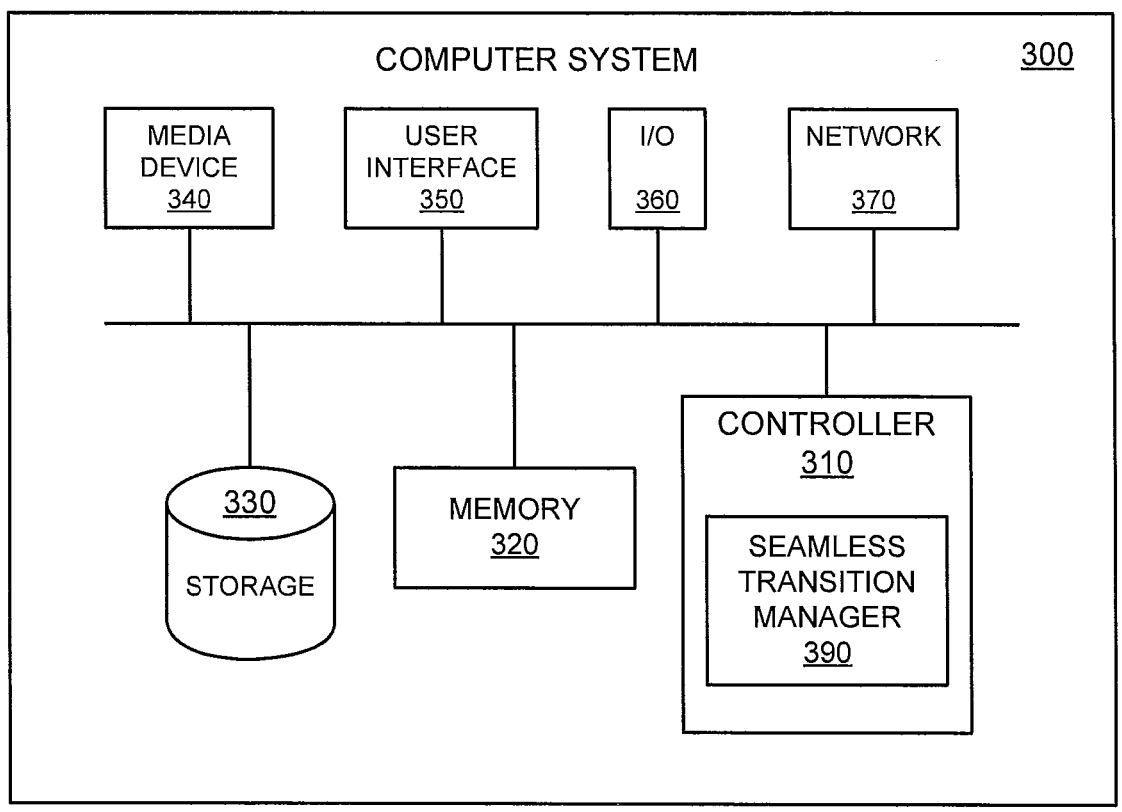
FIG. 3B is a functional block diagram illustrating the computer system hosting a seamless transition manager.

FIG. 3B is a functional block diagram illustrating the computer system 300 hosting the seamless transition manager 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the seamless transition manager 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data temporarily or long term for use by other components of the computer system 300, such as for storing data used by the seamless transition manager 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user. In one implementation, the user interface 350 includes a keyboard, a mouse, audio speakers, and a display. The controller 310 uses input from the user to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the examples focus on an IPTV client and browsing and searching of the media content, but devices other than an IPTV client can be used as a main device and the second device can browse and search for content other than the media content. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of transitioning between a plurality of display applications, the method comprising:
browsing, searching, and selecting media content using a first display application of a second device, wherein the first display application which is an application native to the second device;
selecting a first device to play the media content;
retrieving a device identifier of the first device;
downloading a second display application from a network server to the second device;
launching the second display application by the first display application customized to automatically select the first device using the device identifier,
wherein launching the second display application enables the second device to continue browsing, searching, and selecting media content while the previously selected media content is being played on the first device,
wherein the first device is authenticated for the selected media content and the second device is not authenticated for the selected media content;
sending the selected media content to the first device from the network server upon selection by the second device, the selected media content bypassing the second device, wherein the second device is not given direct access to the selected media content;
performing device discovery using a discovery protocol of the first display application; and
passing information stored in a cookie to the first display application from the second display application to change devices,
wherein the cookie includes information about changing devices.

2. The method of claim 1, wherein the first display application is a native application residing on the second device and is used to control functions of the first device.

3. The method of claim 1, further comprising
running the second display application to browse and search media content.

4. The method of claim 1, wherein the first device is an Internet Protocol television (IPTV) client.

5. The method of claim 4, wherein the second device is a portable device with a display.

6. The method of claim 5, further comprising
controlling functions of the IPTV client using the first display application residing on the portable device to present and play selected media content on a display of the IPTV client.

7. The method of claim 6, wherein the portable device sends a reference identifier of the selected media content to be presented and played on the display of the IPTV client.

8. The method of claim 6, further comprising
running the portable device to browse, search, and select other media content without interrupting the media content being played on the display of the IPTV client.

9. The method of claim 1, wherein launching the second display application comprises
launching a web-based application with information about the first device that was last targeted.

10. The method of claim 1, wherein the device identifier is bookmarked in the second display application.

11. The method of claim 1, further comprising
calling an internal server of the first display application from the second display application to change devices,
wherein the second display application provides information about a changing device.

12. The method of claim 1, further comprising
passing information as an anchor in a URL to the first display application from the second display application to change devices,
wherein the anchor in the URL includes information about a changing device.

13. A non-transitory storage medium storing a computer program to manage transitions between a first display application and a second display application, the computer program comprising executable instructions that cause a computer to:
Browse, search, and select media content using a first display application of a second device, wherein the first display application which is an application native to the second device;
select a first device to play the media content;
retrieve a device identifier of the first device;
download a second display application from a network server to the second device;
launch the second display application by the first display application customized to automatically select the first device using the device identifier,
wherein launching the second display application enables the second device to continue browsing, searching, and selecting media content while the previously selected media content is being played on the first device,
wherein the first device is authenticated for the selected media content and the second device is not authenticated for the selected media content;
send the selected media content to the first device from the network server upon selection by the second device, the selected media content bypassing the second device,
wherein the second device is not given direct access to the selected media content;
perform device discovery using a discovery protocol of the first display application;
pass information stored in a cookie to the first display application from the second display application to change devices,
wherein the cookie includes information about changing devices.

14. The non-transitory storage medium of claim 13, further comprising executable instructions that cause a computer to:
control functions of the first device using the first display application residing on the second device to present and play selected media content on a display of the first device.

15. The non-transitory storage medium of claim 14, wherein executable instructions that cause a computer to launch the second display application comprise executable instructions that cause a computer to:
launch a web-based application with information about the first device that was last targeted.

16. The non-transitory storage medium of claim 13, further comprising executable instructions that cause a computer to:
pass information as an anchor in a URL to the first display application from the second display application to change devices,
wherein the anchor in the URL includes information about a changing device.

* * * * *